(12) United States Patent
Gillet et al.

(10) Patent No.: US 8,484,244 B2
(45) Date of Patent: Jul. 9, 2013

(54) FORECASTING AN AVAILABILITY OF A MEDIA CONTENT ITEM

(75) Inventors: Christophe Gillet, San Francisco, CA (US); Jorge Reyna, Hayward, CA (US)

(73) Assignee: Fanhattan LLC, San Mateo, CA (US)

( * ) Notice: Subject to any disclaimer, the term of this patent is extended or adjusted under 35 U.S.C. 154(b) by 129 days.

(21) Appl. No.: 12/972,258

(22) Filed: Dec. 17, 2010

(65) Prior Publication Data

US 2012/0158708 A1   Jun. 21, 2012

(51) Int. Cl.
 *G06F 17/30* (2006.01)
(52) U.S. Cl.
 USPC .......................................... 707/776
(58) Field of Classification Search
 USPC .......................................... 707/776
 See application file for complete search history.

(56) References Cited

U.S. PATENT DOCUMENTS

| 7,590,546 | B2* | 9/2009 | Chuang | 705/1.1 |
| 7,676,405 | B2* | 3/2010 | Steelberg et al. | 705/28 |
| 2002/0002548 | A1* | 1/2002 | Roundtree | 707/1 |
| 2004/0068451 | A1* | 4/2004 | Lenk et al. | 705/28 |
| 2005/0071323 | A1* | 3/2005 | Gabriel et al. | 707/3 |
| 2007/0094245 | A1* | 4/2007 | Vigil | 707/4 |
| 2008/0040379 | A1* | 2/2008 | Suitts et al. | 707/102 |
| 2008/0059884 | A1* | 3/2008 | Ellis et al. | 715/721 |
| 2008/0163302 | A1* | 7/2008 | Khedouri et al. | 725/46 |
| 2009/0013002 | A1* | 1/2009 | Eggink et al. | 707/104.1 |
| 2010/0287060 | A1* | 11/2010 | Fuxman et al. | 705/26 |
| 2011/0307830 | A1* | 12/2011 | Robert et al. | 715/810 |
| 2012/0078684 | A1* | 3/2012 | Maciocci et al. | 705/7.29 |

FOREIGN PATENT DOCUMENTS

WO   WO-2012083218 A1   6/2012

OTHER PUBLICATIONS

Bjorn Frank, "Optimal Timing of Movie Releases in Ancillary Markets: The Case of Video Releases", Journal of Cultural Economics, 18: 125-133 (1994).*
David Waterman & Sung-Choon Lee, "Time Consistency and the Distribution of Theatrical Films: An Empirical Study of the Video Window", Working Paper Presented at the Allied Social Science Association Annual Meeting, Jan. 2003.*
Lesley Chiou, "The Timing of Movie Releases: Evidence from the Home Video Industry", International Journal of Industrial Organization, 26: 1059-1073 (2008).*

* cited by examiner

*Primary Examiner* — Rehana Perveen
*Assistant Examiner* — Scott A Waldron
(74) *Attorney, Agent, or Firm* — Schwegman Lundberg & Woessner, P.A.

(57) ABSTRACT

In a method and system for forecasting an availability of content, a selection of a media content item is received. Metadata related to the selected media content item is retrieved from a database record corresponding to the media content item. The metadata includes release data for a release window associated with the media content item. Based on the release data indicating the media content item has been released in the release window, an actual release date for the release window is presented to the client device. Based on the release data indicating the media content item has not been released in the release window, an estimated release date and a confidence indicator for the estimated release date for the release window are generated using the retrieved metadata and presented to the client device.

23 Claims, 6 Drawing Sheets

US 8,484,244 B2

FORECASTING AN AVAILABILITY OF A MEDIA CONTENT ITEM

TECHNICAL FIELD

Example embodiments of the present application relate generally to media content, and more specifically, to a system and method for the display and forecasting the availability of content.

BACKGROUND

Multimedia content is generally released according to a staggered release schedule by which one or more distribution channels are granted an exclusive release window to profit off the content. For example, at any given time in the release schedule, content may be released in one or more of movie theaters, pay-per-view cable channels, subscription-based cable or satellite television channels, broadcast television, wide area networks (e.g., the Internet), or optical media, such as DVDs and Blu-Ray® discs. While the sequence of distribution channels through which multimedia content is released is generally known, the amount of time the multimedia content is available in each release window is variable and not well publicized.

BRIEF DESCRIPTION OF DRAWINGS

The present invention is illustrated by way of example, and not by way of limitation, in the figures of the accompanying drawings.

DETAILED DESCRIPTION

Although the disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In various embodiments, a system and method to forecast the availability of content in one or more release windows is disclosed. A selection of a media content item may be received. Metadata related to the selected media content item is retrieved from a database record corresponding to the media content item. The metadata may include release data for at least one release window associated with the media content item. Based on the release data indicating the media content item has been released in a release window of the at least one release window, an actual release date for the release window is presented to the client device. Based on the release data indicating the media content item has not been released in the release window of the at least one release window, an estimated release date and a confidence indicator for the estimated release date for the release window are generated using the retrieved metadata. The estimated release date and the confidence indicator are presented to the client device.

Figure 1:
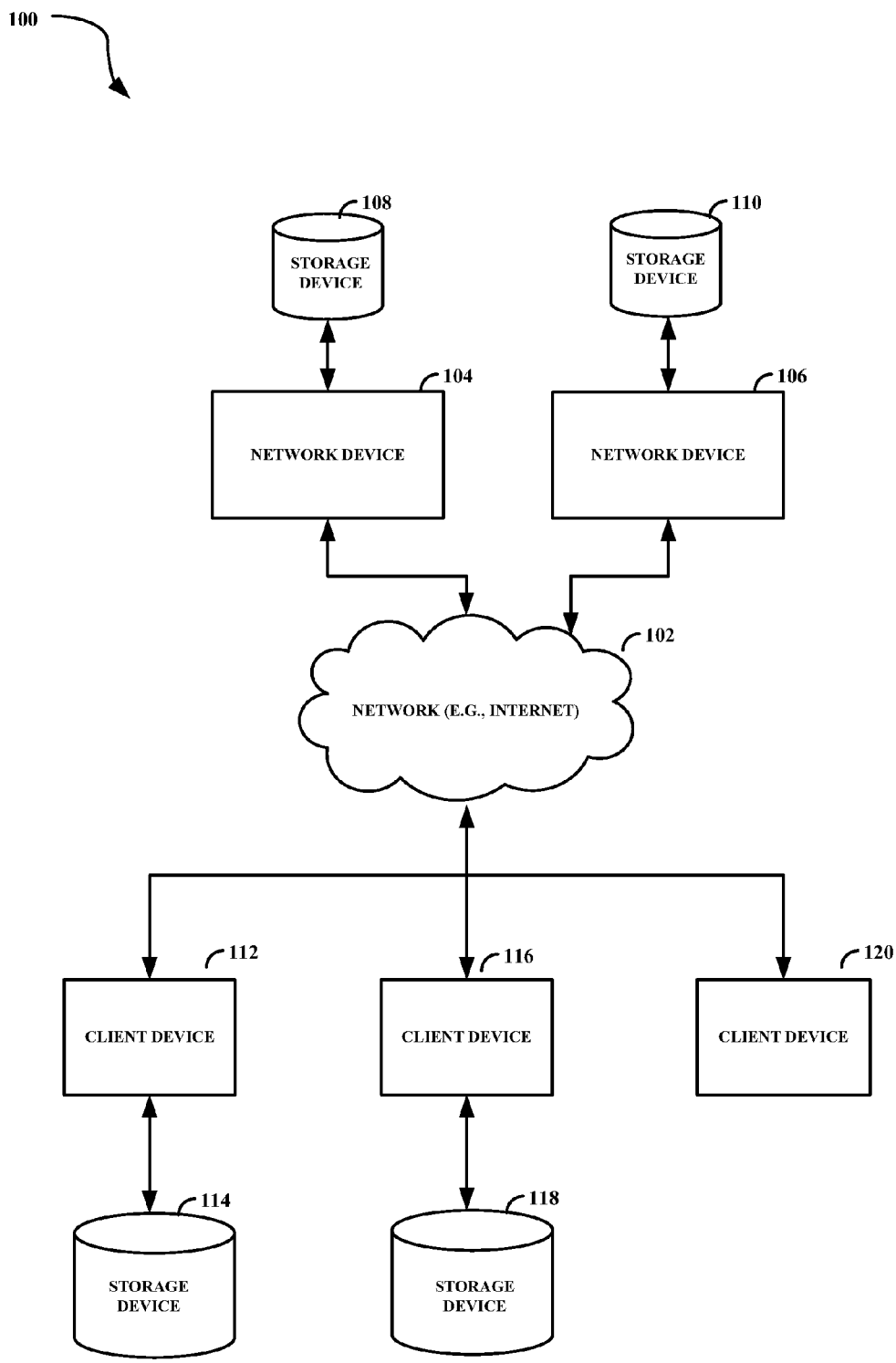
FIG. 1 is a block diagram illustrating a network system having an architecture configured for exchanging data over a network, according to an example embodiment.

FIG. 1 is a block diagram illustrating an example network system 100 connecting one or more client devices 112, 116, 120 to one or more network devices 104, 106 via a network 102. The one more client devices 112, 116, 120 may include Internet- or network-enabled devices, such as consumer electronics devices (e.g., televisions, DVD players, Blu-Ray® players, set-top boxes, portable audio/video players, gaming consoles) and computing devices (e.g., personal computer, laptop, tablet computer, smart phone, mobile device). The type of client devices is not intended to be limiting, and the foregoing devices listed are merely examples. The client devices 112, 116, 120 may have remote, attached, or internal storage devices 114, 118. One or more of the client devices 112, 116, 120 may have installed thereon and may execute a client application (not shown) that enables the client device to serve as a local media server instance. The client application may search for and discover media content (e.g., audio, video, images) stored on the device as well as media content stored on other networked client devices having the client application installed thereon. The client application may aggregate the discovered media content, such that a user may access local content stored on any client device having the client application installed thereon. The discovered media content may be stored in an aggregated data file, which may be stored on the client device. The local content may be indexed by the client device in which the content resides. The client application also may present a variety of remote sources to the user from which the user is able to download, stream, or otherwise access a particular media content item. For example, the client application may present to the user all streaming, rental, and purchase options for the media content item to the extent they exist and are available for access.

One or more network devices 104, 106 may be communicatively connected to the client devices 112, 116, 120 via network 102. The network devices 104, 106 may be servers storing media content or metadata relating to media content available to be accessed by the client devices 112, 116, 120. In an example embodiment, network devices 104, 106 may include proprietary servers related to the client application as well as third party servers hosting free or subscription-based content. Additional third-party servers may include servers operating as metadata repositories. For example, in the context of movies, third-party servers may be servers associated with the themoviedb.org and other third-party aggregators that store and deliver movie metadata in response to user requests. The network devices 104, 106 may include attached storage devices or may interface with databases or other storage devices 108, 110. For illustrative purposes only, the network devices 104, 106 have been shown as a single device in FIG. 1, although it is contemplated that the network devices 104, 106 may include one or more web servers, application servers, database servers, and so forth, operating in conjunction to store and deliver content via network 102.

The proprietary servers may store metadata related to media content and data that facilitates identification of media content across multiple content servers. For example, the proprietary servers may store identifiers for media content that are used to interface with third party servers that store or host the media content. The proprietary servers further may include one or more modules capable of verifying the identity of media content and providing access information concerning media content (e.g., the source(s) of media content, the format(s) of media content, the availability of media content).

The client application installed on one or more of the client devices 112, 116, 120 may enable a user to search for media content or navigate among categories of media content. To find media content, a user may enter search terms in a user interface of the client application to retrieve search results, or the user may select among categories and sub-categories of media content to identify a particular media content item. For each browsed content item, the client application may display metadata associated with the content item. The metadata may be retrieved from both local and remote sources. The metadata may include but are not limited to a title of the content item, one or more images or video clips related to the content item, a release date of the content item, a cast of the content item, one or more reviews of the content item, and release windows and release dates for various distribution channels for the browsed content item. For example, if the browsed content item is a movie, the metadata displayed with the movie may include a release date on which the movie was released in movie theaters. In the event the browsed content item has not been released for a particular distribution channel in a release window, the client application may either display an indication that the content item is not available for the particular distribution channel or an estimated availability date for the content item for the particular distribution channel. The estimated availability date for the content item for the particular distribution channel may have a confidence or reliability indicator associated with the estimated date, in order to provide the user with an indication of how probable the content item will be available on the estimated release date.

Figure 2:
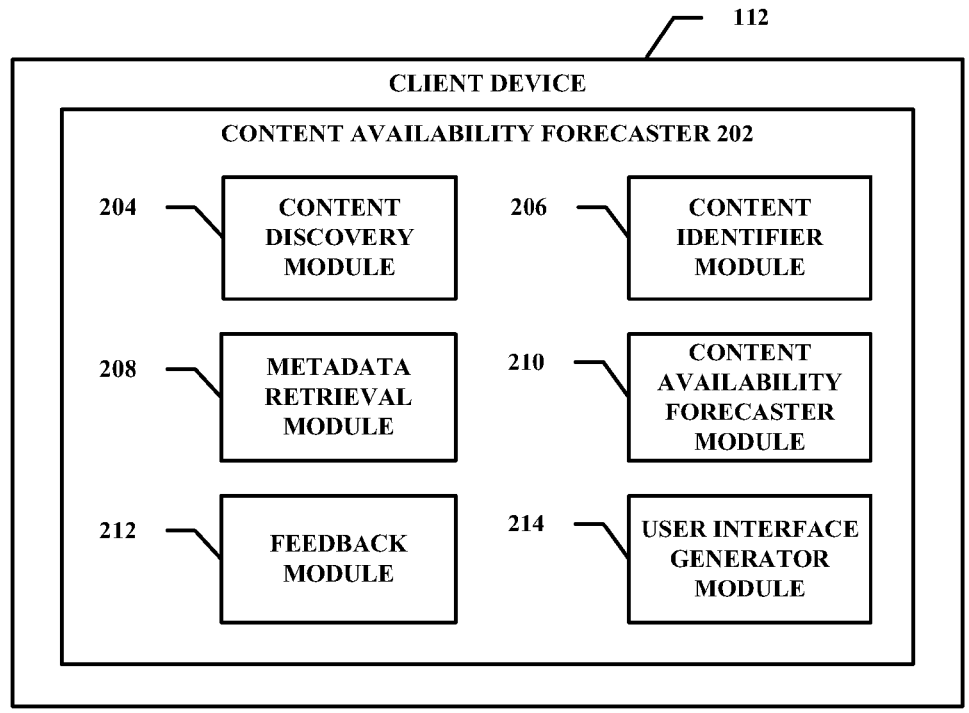
FIG. 2 is a block diagram showing modules of a content availability forecaster program, executing on a client machine or network device, according to an example embodiment.

FIG. 2 is a block diagram showing certain modules of a content availability forecaster, executing on a client machine or network device, according to an example embodiment. Although the modules are shown in FIG. 2 as being part of a client device, it is contemplated that the modules may be implemented on a network device, such as a server. In an example embodiment, the content availability forecaster 202 may be part of the client application discussed with reference to FIG. 1. In an example embodiment, one or more processors of the client or network device may execute or implement the modules.

The content availability forecaster 202 includes modules, such as a content discovery module 204, a content identifier module 206, a metadata retrieval module 208, a content availability forecaster module 210, a feedback module 212, and a user interface generator module 214 to perform operations of an example embodiment.

The content discovery module 204 may scan a local client device 112 for video content. The local client device 112 may be a device on which the client application discussed with reference to FIG. 1 is installed. The content discovery module 204 also may scan other client devices 116, 120 connected to the local client device 112 via a local area network and having the client application installed. The scanned content may be recorded by the content discovery module 204 and associated with the client device 112, 116, 120 from which it was recorded. The content discovery module 204 further may scan the local and networked client devices at a predetermined time or at predetermined intervals of time for changes in content. In an example embodiment, the content discovery module 204 may scan each and every storage device attached to the client devices 112, 116, 120, including removable storage (e.g., external hard drives, portable USB drives) 114, 118, provided the removable storage is attached to a client device at the time of scanning. In an example embodiment, the content discovery module 204 may instead scan frequently accessed folders or designated folders.

The content identifier module 206 may receive a list of discovered media content items from the content discovery module 204 and may generate an identifier for each media content item. The identifier may be a hash value generated from the media content item. The identifier may be used as a key to find an associated identifier used by a media content database, such as the database operated by themoviedb.org ("TMDB") or other third-party aggregators. To access the media content database, the hash value may be passed as part of an API call over the network that interfaces with the media content database. An associated TMDB identifier may be returned. The content identifier module 206 further may receive a selection of a media content item from a user. Either the content discovery module 204 or the content identifier module 206 also may identify remote sources storing or hosting media content items.

The metadata retrieval module 208 may receive data related to the storage location of a media content item and the TMDB identifier from the content identifier module 206. The metadata retrieval module 208 may retrieve metadata related to each media content item and store the metadata with the location of the content item and the associated TMDB identifier. Metadata may be retrieved from multiple sources, including remote sources, such as TMDB, and local sources, such as other networked client devices. Metadata may include a release date or estimated release date maintained by the remote source. It is possible that different remote sources may have different listed release dates or estimated release dates owing to the variable and uncertain release windows for media content items.

Each client device having the client application installed thereon may include a local metadata database file storing metadata for media content items. As additional metadata is retrieved from various remote or local sources, the database entry for the media content item may be supplemented by the additional metadata. Metadata may be retrieved from various sources as those sources are accessed for media content. For example, if a user selects a remote source for streaming a particular media content item, the metadata retrieval module 208 may retrieve metadata associated with the media content item as part of the streaming process. In an example embodiment, for each content item, metadata corresponding to a source, distribution channel type, release date (if ascertainable), and price may be stored. For example, if a media content item is available for purchase through Amazon.com®, metadata stored with the content item may include Amazon.com® as a source for the content item, "purchase" as the distribution channel type associated with Amazon.com®, a date which the item was or will be first available for purchase, and price charged by Amazon.com® to purchase the media content item. In an example embodiment, the metadata retrieval module 208 further may periodically refresh the database file with new data from other client devices and certain remote sources (e.g., TMDB, Amazon.com®).

The content availability forecaster module 210 may access or receive the metadata retrieved by the metadata retrieval module 208 for a particular content item and may generate an estimated release date for the particular content item for a given release window, distribution channel, and source. The content availability forecaster module 210 also may assign a confidence or reliability value to its estimated release date for the distribution channel and source. For media content items already released in a release window for a given distribution channel, the confidence or reliability value may be assigned a 100% value since the release date has already occurred and can be accurately verified, and the content item is available for the source. For media content items yet to be released in a release window for a given distribution channel, the content availability forecaster module 210 may generate a prediction of the estimated release date of the media content item for the distribution channel and source. The content availability forecaster module 210 may consider certain metadata, including but not limited to, market trends, such as similarly released media content items, historical data, the amount of revenue generated by the media content item in a prior or current release window, the genre of the media content item, the popularity of the media content item (as measured by total revenue, revenue trends, ratings, reviews, social networking trends, word of mouth, and so forth), actions taken by the competition to the media content item, and the time of year (e.g., holidays, upcoming awards). For example, the more revenue a media content item generates in a release window and distribution channel, the longer it may stay in the release window for that distribution channel, thereby delaying the content item's release window for a subsequent distribution channel. In an example embodiment, the content availability forecaster module 210 may employ an algorithm using the one or more of the types of metadata described above as inputs to generate an estimated release date as an output. In an example embodiment, the content availability forecaster module 210 may assign weights to the pieces of metadata, reflecting that certain metadata may be more relevant in estimating a release date for a release window.

In addition, the content availability forecaster module 210 may generate a confidence or reliability indicator to accompany the estimated release date for each distribution channel and source pairing. The confidence indicator may be generated using much of the same metadata used to generate the estimated release date for the distribution channel and source. In an example embodiment, trend data may influence the confidence indicator as the end of a release window and the beginning of another release window for a content item may be gleaned from trend data. For example, if the revenue for a movie currently playing in a movie theater is decreasing on a weekly basis, the confidence indicator may be a high value indicating that there is a strong likelihood that the movie will be released for rental on the generated estimated release date.

A feedback module 212 may aid in the refinement of the accuracy of the estimated release date and confidence indicator associated with a media content item, distribution channel, and source. The feedback module may employ a community vetting process to assess the accuracy of the estimated release date. The estimated release date and confidence indicator for a release window may be presented to users who browse or search for the media content item. Users may be given the opportunity to verify the estimated release date or submit an alternate release date, to the extent known by the user. The user-submitted verification data may be evaluated by the feedback module 212, and if deemed reliable, may be used by the content availability forecaster module 210 to refine or revise either or both of the estimated release date and the confidence indicator.

In an example embodiment, the feedback module 212 may evaluate the reliability of the user-submitted verification data by aggregating the user-submitted responses by response type and identifying any consistencies or patterns among the user-submitted responses. If a certain number of users confirm the estimated release date for a given release window, the content availability forecaster module 210 may increase the confidence indicator associated with the estimated release date. In an example embodiment, the feedback module 212 may compare the number of users who confirm or deny the release date to a predetermined threshold value. If the number of confirmations or denials exceeds the predetermined threshold value, the content availability forecaster module 210 may increase or decrease the confidence indicator value accordingly.

In an example embodiment, the feedback module 212 may consider the context of a user submitting a response when refining or revising the confidence indicator or estimated release date. For example, a user associated with the industry of the media content item may be considered more reliable than a random user, and consequently, the industry user's response may be accorded more deference than the random user's response.

The content availability forecaster module 210 may return the actual release date or generate an estimated release date and confidence indicator for each content item and for each distribution channel and source pairing for a particular content item.

A user interface generator module 214 may merge the estimated or actual release dates and confidence indicators for each release window for a media content item. The user interface generator module 214 may generate a user interface that presents the merged data to the user to permit the user to view the different release windows for a media content item. This consolidated view may enable a user to make informed decisions on whether to act on a media content item (e.g., purchase tickets for a theater, rent, buy) or wait until the media content item becomes available in a different release window. Also, the consolidated view may allow a user to identify the sources through which the media content item is currently available compared to other sources through which the content item will become available in the future. The user interface may include user-selectable elements corresponding to source and distribution channel pairings through which the media content item is available. For example, if the media content item is available for rent as a disc from a source, a user-selected element may be provided to indicate this availability. A user may select the user-selectable element to access the media content item from the source and via the distribution channel. In the foregoing example, a user may select the user-selectable element to initiate the renting of the media content item on a disc from the source.

Figure 3:
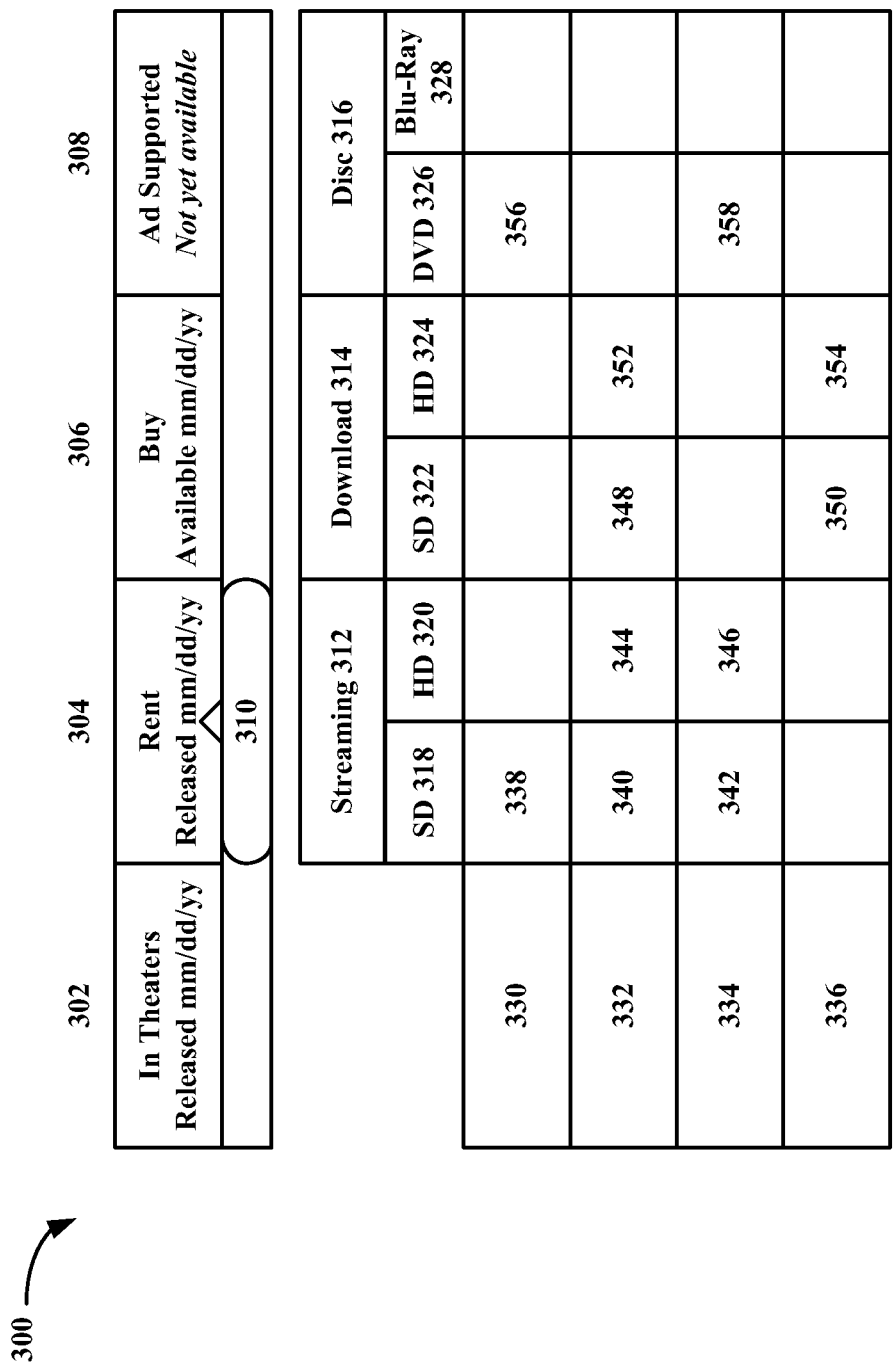
FIG. 3 is a diagram of a user interface for forecasting the availability of content, according to an example embodiment.

FIG. 3 is a diagram of a user interface for forecasting the availability of content, according to an example embodiment. The user interface may be presented by the client application of FIG. 1 to a user who has navigated to a particular media content item. The example embodiment of FIG. 3 relates to a movie, but other types of content may employ the example user interface. In FIG. 3, the user interface 300 may present various release windows 302, 304, 306, 308 in which the movie is or will be made available. For example, the release windows may include In Theaters 302, For Rent 304, For Purchase 306, and Ad Supported viewing 308. The release date associated with each release window may be an actual or estimated release date, as determined by the content availability forecaster module 210 of FIG. 2. A slider bar 310 may enable the user to navigate between the various release windows 302, 304, 306, 308. As the slider bar navigates between the various release windows 302, 304, 306, 308, the user interface may be updated with the sources and distribution channels associated with the selected release window. In the example embodiment of FIG. 3, the slider bar 310 has selected the "Rent" release window 304 for the movie. Accordingly, the user interface 300 may display the rental options for the movie by distribution channel (e.g., streaming video 312, download 314, disc 316) and source 330, 332, 334, 336.

In the example embodiment of FIG. 3, the available options may be presented in a grid format, although other presentation formats may be used. Sub-categories 318, 320, 322, 324, 326, 328 for each distribution channel 312, 314, 316 may be displayed as well. For example, under the streaming video option 312, the user may have the option of selecting between a standard definition ("SD") streaming option 318 or a high-definition ("HD") streaming option 320. Similarly, SD 322 and HD 324 options may be presented for the download distribution channel 314. DVD 326 and Blu-Ray® 328 options may be presented for the disc 316 rental distribution channel. One or more sources 330, 332, 334, 336 may be listed as providing the movie via one or more of the distribution channels (e.g., streaming 312, download 314, disc 316). Some examples of sources for the movie may include Netflix®, Amazon.com®, Blockbuster Video®, and Apple iTunes®. Each source may not be able to provide the movie under every distribution channel. If a source is able to provide the movie under a particular distribution channel, a price may be listed in the corresponding square of the grid. For example, in FIG. 3, the first source 330 is able to provide the movie via streaming video 312, and specifically, via SD streaming 318. Thus, a price may be listed in the corresponding square 338 in the grid. In certain cases, the price may be free. The free access to the content may reflect that the source offers the content for free or that the content is offered as part of a user subscription. Different prices for accessing the content via different sources and distribution channels are thus presented in the corresponding squares 340 through 358 of the grid. Each grid square containing a price may be a user-selectable link that accesses the content via the selected source and distribution channel upon selection by the user. In an example embodiment, the user-selectable link may redirect the user to a display screen or webpage to facilitate payment for the content. In an example embodiment, the user-selectable link may permit the user to directly access the content without first requiring payment for the content. As additional access options become available, the user interface may be dynamically updated or re-generated to reflect the current available access options for the content item.

Figure 4:
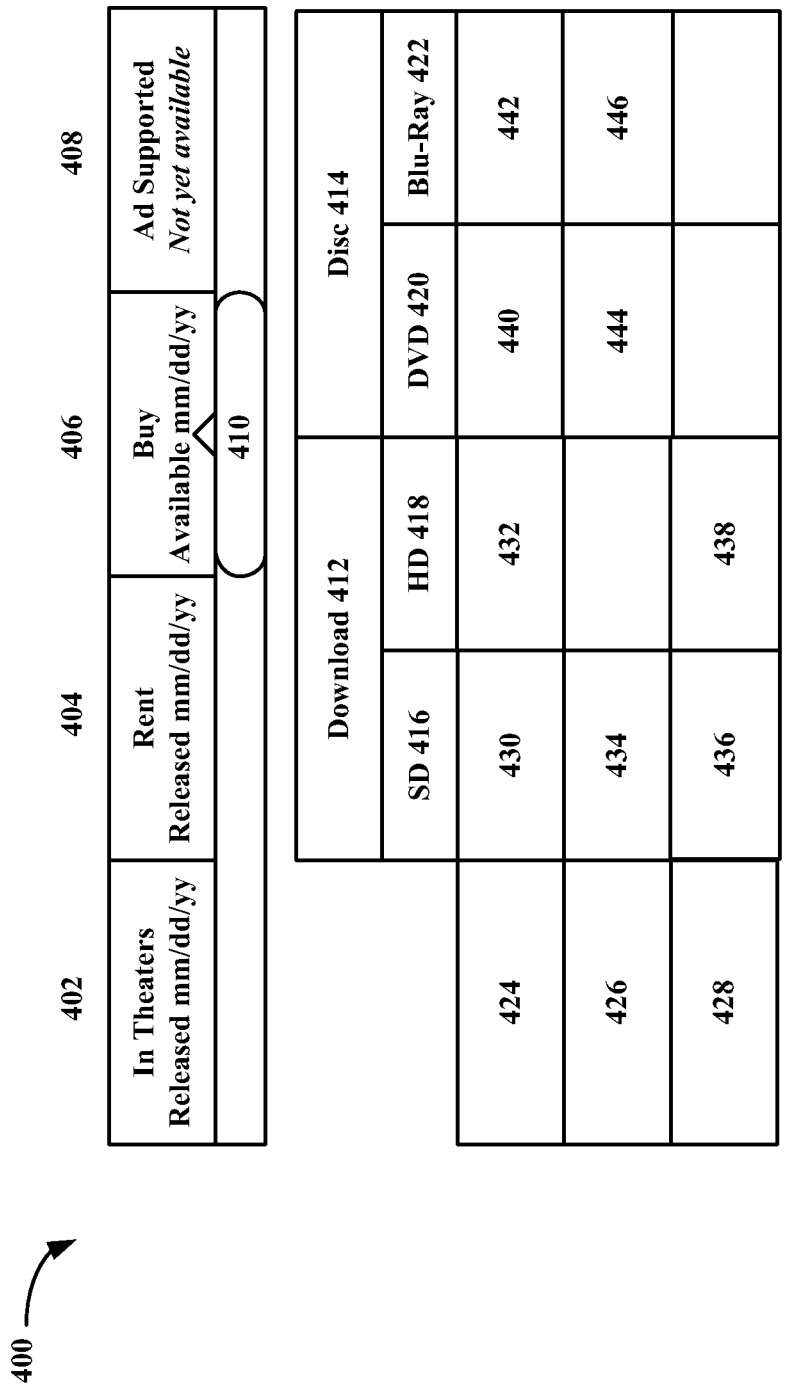
FIG. 4 is a diagram of a user interface for forecasting the availability of content, according to an example embodiment.

FIG. 4 is a diagram of a user interface for forecasting the availability of content, according to an example embodiment. FIG. 4 illustrates an example embodiment of a user interface for purchasing a content item from one or more sources and via one or more distribution channels. In the example embodiment of FIG. 4, the user interface may indicate that the content item is not yet available for purchase. The user interface may provide an estimated release date for the content item to be purchased. Even though the content item may not be available for purchase yet, as indicated by the estimated release date for the "Buy" release window, the user interface may nevertheless present various purchase options by source and distribution channel for a user to pre-order the content item. For each available distribution channel (e.g., download 412, disc 414), one or more sources 424, 426, 428 may be listed. Prices for purchasing the content item from a source via a particular distribution channel may be listed in the various grid squares 430 through 446 containing prices therein. Upon the user selection of a price, the process for purchasing the content item may be initiated. The process may comprise interfacing between the client application executing on the client device and a remote server via the network to carry out payment and shipping or delivery procedures for obtaining or accessing the content.

Figure 5:
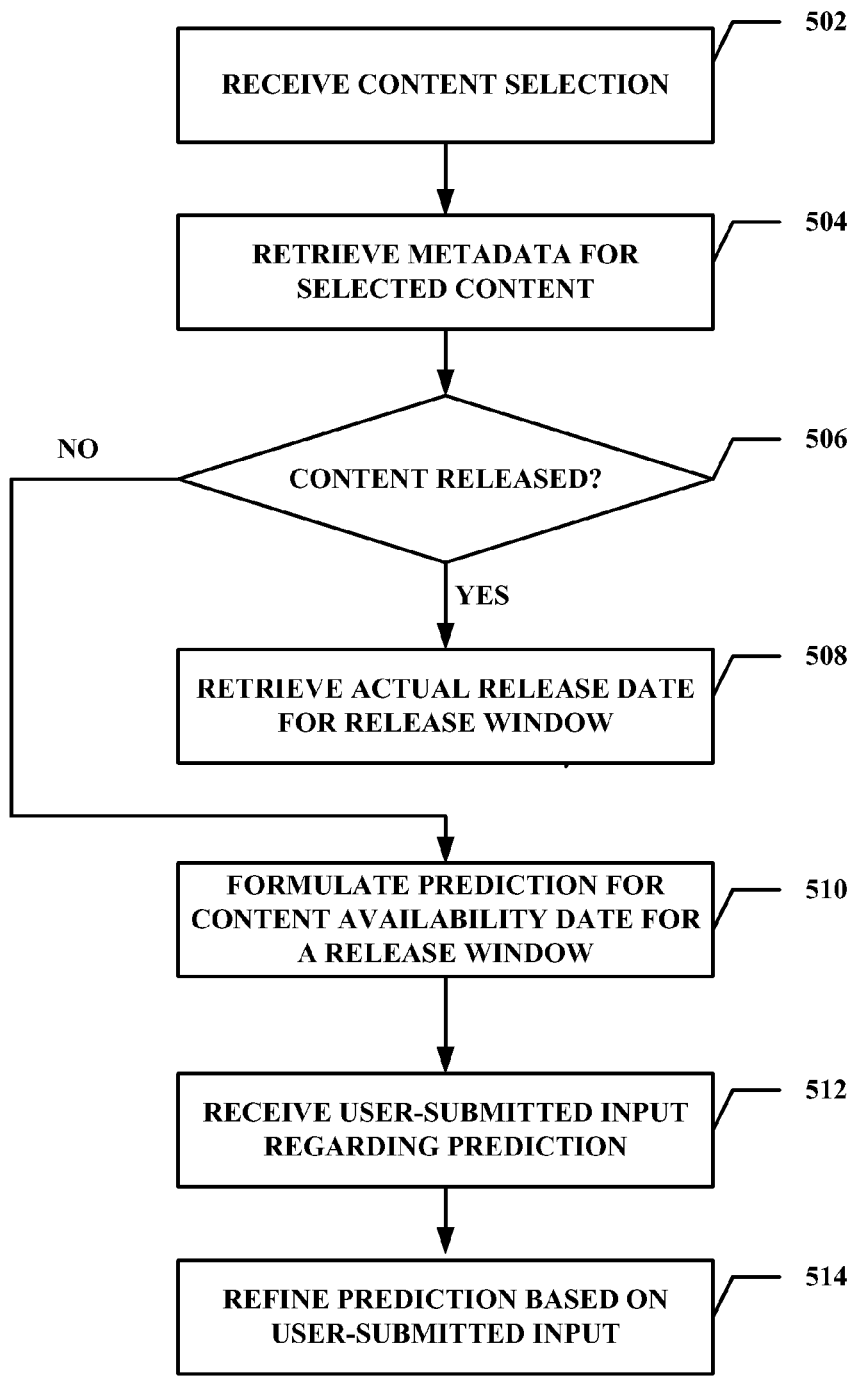
FIG. 5 is a flowchart that illustrates an example method of forecasting the availability of content.

FIG. 5 is a flowchart that illustrates an example method of forecasting the availability of content. In FIG. 5, the client application of FIG. 1 may receive a selection of a media content item at operation 502. The client application may provide a user interface by which a user may navigate among media content categories, such as genre, year of release, most popular choices, and so forth. Alternatively, the user may search for a specific media content item by entering search terms into a user interface. The media content item may be stored locally or made available for access remotely.

At operation 504, metadata associated with the selected content item may be retrieved from a database record corresponding to the selected media content item. The metadata may include an identifier associated with a third-party database storing metadata relating to the content item. The identifier may be associated with the content item by generating a hash value of the content item and using the hash value as a key to retrieve the identifier. The metadata also may include release data for at least one release window associated with the media content item and distribution channels and sources associated with each release window. The metadata also may include identifying information for the selected media content item, such as the title of the content item, images of the content item, reviews and ratings for the content item, a cast for the content item, and so forth.

At operation 506, a determination may be made as to whether the content item has been released for a particular release window. If the content item has been released for the particular release window, at operation 508, the actual release date may be retrieved from one or more sources, either locally or remotely. Additionally, to the extent not already determined, the sources through which the media content item is available may be retrieved either from the locally maintained database file entry associated with the content item or remotely.

If the content item has not been released for the particular release window, at operation 510, an estimated release date for the media content item for a particular release window may be generated. The metadata retrieved in operation 504 may be used to generate the estimated release date. For example, the metadata may include market trends, such as similarly released media content items, historical data, the amount of revenue generated by the media content item in a prior or current release window (for a different distribution channel), the genre of the media content item, the popularity of the media content item (as measured by total revenue, revenue trends, ratings, reviews, social networking trends, word of mouth, and so forth), actions taken by the competition in relation to the media content item, and the time of year the media content item was released in a different release window (e.g., holidays, awards season). A confidence indicator may be generated as well from the retrieved metadata. The confidence indicator may reflect a confidence in the accuracy of the estimated release date for the particular release window.

At operation 512, the release windows and actual or estimated release dates for each release window associated with the media content item may be aggregated and presented to the user in a user interface. The user interface may present the sources and distribution channels for each release window. In response to the presentation of the release windows, sources, and distribution channels, users may be presented with an option to respond to an estimated release date for a particular release window. The user's response may confirm or reject the accuracy of the estimated release date for the particular release window. In an example embodiment, the user may submit an alternate release date for the release window.

At operation 514, based on the user submissions either confirming or rejecting the estimated release date for a release window, or providing an alternate release date for the release window, the estimated release date may be refined. In an example embodiment, the estimated release date may be refined if a predetermined number of users that reject the estimated release date exceeds a threshold number. In an example embodiment, the estimated release date may be refined using a particular user or group of user's submissions if the context associated with the users indicates that the users are particularly trustworthy. For example, the users may have insight or inside information as to the release date for a particular release window by being industry insiders.

Modules, Components and Logic

Certain embodiments are described herein as including logic or a number of components, modules, or mechanisms. A component or module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component or a module may be implemented mechanically or electronically. For example, a component or a module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components at different times. Software may accordingly configure a processor, for example, to constitute a particular component or module at one instance of time and to constitute a different component or module at a different instance of time.

Components or modules can provide information to, and receive information from, other components or modules. Accordingly, the described components may be regarded as being communicatively coupled. Where multiple of such components or modules exist contemporaneously, communications may be achieved through signal transmission (e.g., over appropriate circuits and buses) that connect the components or modules. In embodiments in which multiple components or modules are configured or instantiated at different times, communications between such components or modules may be achieved, for example, through the storage and retrieval of information in memory structures to which the multiple components or modules have access. For example, one component or module may perform an operation, and store the output of that operation in a memory device to which it is communicatively coupled. A further component or module may then, at a later time, access the memory device to retrieve and process the stored output. Components or modules may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 6:
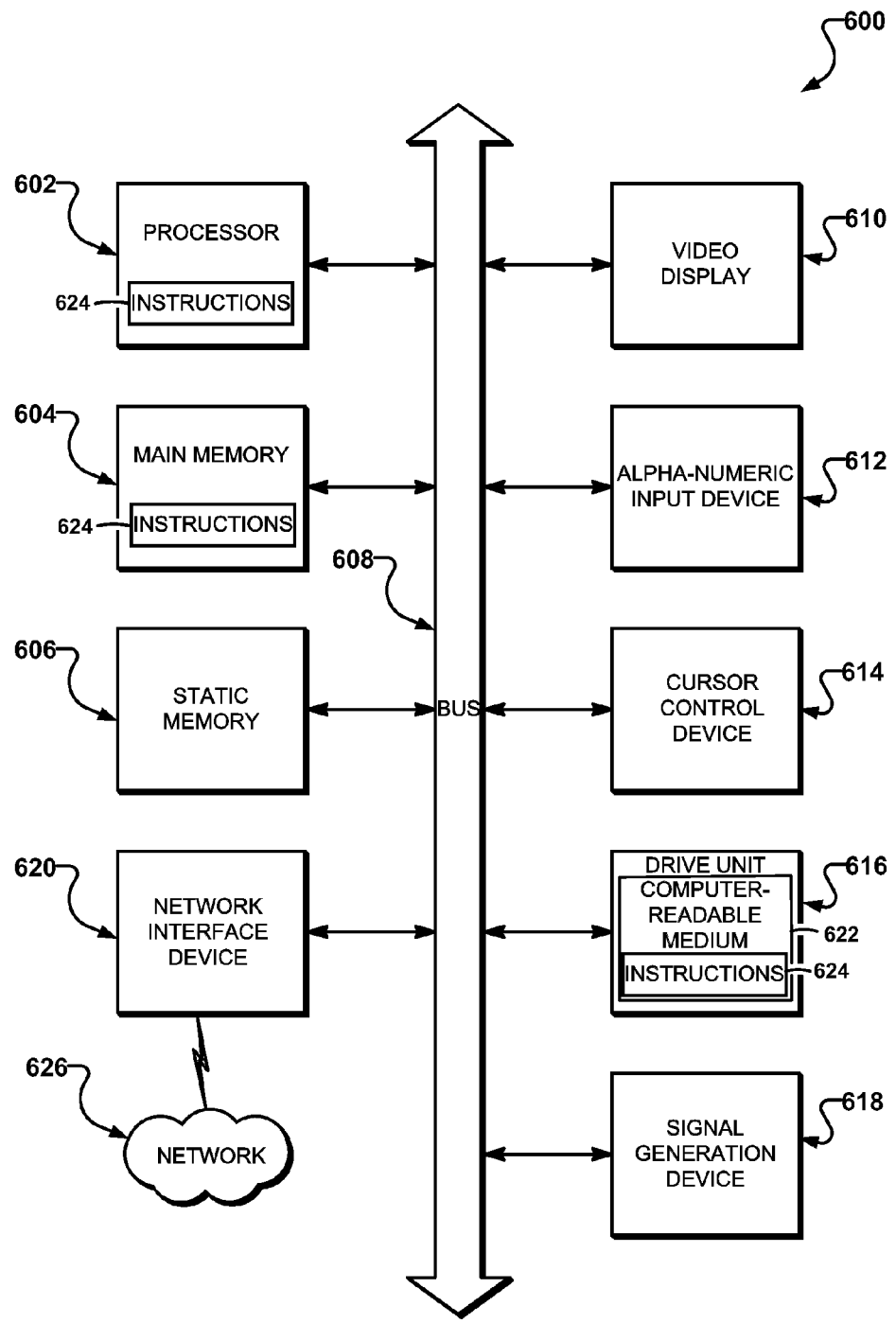
FIG. 6 shows a diagrammatic representation of a machine in the example form of a computer system.

FIG. 6 is a block diagram of machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes at least one processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any non-transitory tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 624 may further be transmitted or received over a communications network 626 using a transmission medium. The software 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third storage tier may be a persistent storage medium or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, distributed or so some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, or server computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server and/or client software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client may for example include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an Internet, Local Area Network (LAN), Wide Area Network (WAN), or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method to forecast an availability of content, the computer-implemented method comprising:
   receiving, at a client device, a selection of a media content item;
   retrieving metadata associated with the media content item from a database record corresponding to the media content item,
   the metadata comprising: similarly released media content item data, historical data, genre of the media content item data, popularity of the media content item data, time of the year data, release data for at least one release window associated with the media content item, and amount of revenue generated by the media content item in a prior or current release window data,
   the at least one release window specifying a period of time during which a distribution channel is permitted to distribute the media content item, the metadata, except for the release data itself, affecting the release data;
   based on the release data indicating the media content item has been released in a release window of the at least one release window, presenting an actual release date for the release window to the client device, the actual release date obtained from the retrieved metadata;
   based on the release data indicating the media content item has not been released in the release window of the at least one release window:
      calculating an estimated release date and a confidence indicator for the estimated release date for the release window of the media content item using the retrieved metadata; and
      presenting the estimated release date and the confidence indicator to the client device.

2. The computer-implemented method of claim 1, further comprising:
   identifying a source that delivers the media content item via the distribution channel for the at least one release window.

3. The computer-implemented method of claim 2, further comprising generating a user interface comprising:
   the at least one release window for the media content item;
   a corresponding release date for each of the at least one release window, the corresponding release date being one of the actual release date and the estimated release date; and
   for each of the at least one release window:
      the distribution channel via which the media content item is available for access; and
      the source of the media content item,
   wherein the user interface includes user-selectable indicators for each source and distribution channel pairing in which the media content item is available.

4. The computer-implemented method of claim 3, further comprising:
   receiving a selection of a user-selection indicator for a source and distribution channel pairing; and
   accessing the media content item from the source via the distribution channel.

5. The computer-implemented method of claim 1, further comprising receiving feedback responsive to the presenting of the estimated release date to the client device, the feedback comprising at least one of an affirmation of the estimated release date, a rejection of the estimated release date, and a revision of the estimated release date.

6. The computer-implemented method of claim 5, further comprising:
responsive to the received feedback, revising the confidence indicator for the estimated release date.

7. The computer-implemented method of claim 5, further comprising: aggregating the received feedback by type of response;
comparing aggregated feedback corresponding to a response type to a predetermined threshold; and
revising the confidence indicator based on a determination that the aggregated feedback of the response type exceeds the predetermined threshold.

8. The computer-implemented method of claim 1, wherein the media content item is detected by scanning locally networked devices for stored content and by interfacing with external sources to determine an availability of the media content item at the external sources.

9. A non-transitory machine-readable medium storing a set of instructions that, when executed by a processor, causes the processor to perform operations comprising:
receiving, at a client device, a selection of a media content item;
retrieving metadata associated with the media content item from a database record corresponding to the media content item,
the metadata comprising: similarly released media content item data, historical data, genre of the media content item data, popularity of the media content item data, time of the year data, release data for at least one release window associated with the media content item, and amount of revenue generated by the media content item in a prior or current release window data,
the at least one release window specifying a period of time during which a distribution channel is permitted to distribute the media content item, the metadata, except for the release data itself, affecting the release data;
based on the release data indicating the media content item has been released in a release window of the at least one release window, presenting an actual release date for the release window to the client device, the actual release date obtained from the retrieved metadata;
based on the release data indicating the media content item has not been released in the release window of the at least one release window:
calculating an estimated release date and a confidence indicator for the estimated release date for the release window of the media content item using the retrieved metadata; and
presenting the estimated release date and the confidence indicator to the client device.

10. The non-transitory machine-readable medium of claim 9, further comprising:
identifying a source that delivers the media content item via the distribution channel for the at least one release window.

11. The non-transitory machine-readable medium of claim 10, further comprising generating a user interface comprising:
the at least one release window for the media content item;
a corresponding release date for each of the at least one release window, the corresponding release date being one of the actual release date and the estimated release date; and
for each of the at least one release window:
the distribution channel via which the media content item is available for access; and
the source of the media content item,
wherein the user interface includes user-selectable indicators for each source and distribution channel pairing in which the media content item is available.

12. The non-transitory machine-readable medium of claim 11, further comprising: receiving a selection of a user-selection indicator for a source and distribution channel pairing; and
accessing the media content item from the source via the distribution channel.

13. The non-transitory machine-readable medium of claim 9, further comprising receiving feedback responsive to the presenting of the estimated release date to the client device, the feedback comprising at least one of an affirmation of the estimated release date, a rejection of the estimated release date, and a revision of the estimated release date.

14. The non-transitory machine-readable medium of claim 13, further comprising:
responsive to the received feedback, revising the confidence indicator for the estimated release date.

15. The non-transitory machine-readable medium of claim 13, further comprising: aggregating the received feedback by type of response;
comparing aggregated feedback corresponding to a response type to a predetermined threshold; and
revising the confidence indicator based on a determination that the aggregated feedback of the response type exceeds the predetermined threshold.

16. The non-transitory machine-readable medium of claim 9, wherein the media content item is detected by scanning locally networked devices for stored content and by interfacing with external sources to determine an availability of the media content item at the external sources.

17. A system for forecasting an availability of content, comprising:
a processor-implemented content identifier module configured to receive a selection of a media content item and identify a database record corresponding to the selected media content item;
a processor-implemented metadata retrieval module configured to retrieve metadata from the database record,
the metadata comprising: similarly released media content item data, historical data, genre of the media content item data, popularity of the media content item data, time of the year data, release data for at least one release window associated with the media content item, and amount of revenue generated by the media content item in a prior or current release window data,
the at least one release window specifying a period of time during which a distribution channel is permitted to distribute the media content item, the metadata, except for the release data itself, affecting the release data; and
a processor-implemented content availability forecaster module configured to:
return an actual release date for a release window of the at least one release window, the actual release date obtained from the retrieved metadata based on the release data indicating the media content item has been released in the release window;
calculate an estimated release date and a confidence indicator for the estimated release date for the release window of the media content item using the retrieved metadata based on the release data indicating the media content item has not been released in the release window of the at least one release window; and return the estimated release date and the confidence indicator.

18. The system of claim 17, further comprising:
a processor-implemented content discovery module configured to scan a device for media content items,
wherein the processor-implemented content identifier module is further configured to identify the scanned media content items.

19. The system of claim 17, wherein the processor-implemented content identifier module is further configured to identify a source that delivers the media content item via the distribution channel for the at least one release window.

20. The system of claim 19, further comprising a processor-implemented user interface generator configured to generate a user interface displaying:
the at least one release window for the media content item;
a corresponding release date for each of the at least one release window, the corresponding release date being one of the actual release date and the estimated release date; and
for each of the at least one release window:
the distribution channel via which the media content item is available for access; and
the source of the media content item,
wherein the user interface includes user-selectable indicators for each source and distribution channel pairing in which the media content item is available.

21. The system of claim 17, further comprising a processor-implemented feedback module configured to receive feedback responsive to the presentation of the estimated release date to the client device, the feedback comprising at least one of an affirmation of the estimated release date, a rejection of the estimated release date, and a revision of the estimated release date.

22. The system of claim 21, wherein responsive to the received feedback, the processor-implemented content availability forecaster module is further configured to revise the confidence indicator for the estimated release date.

23. The system of claim 21, wherein responsive to the received feedback, the processor-implemented feedback module is further configured to:
aggregate the received feedback by type of response; and
compare aggregated feedback corresponding to a response type to a predetermined threshold, and
wherein the processor-implemented content availability forecaster module is further configured to revise the confidence indicator based on a determination that the aggregated feedback of the response type exceeds the predetermined threshold.

* * * * *